United States Patent
Peng et al.

(10) Patent No.: US 12,400,471 B2
(45) Date of Patent: Aug. 26, 2025

(54) AUTOMATIC IRIS CAPTURING METHOD AND APPARATUS, COMPUTER-READABLE STORAGE MEDIUM, AND COMPUTER DEVICE

(71) Applicants: EYECOOL SHENZHEN TECHNOLOGY CO., LTD., Guangdong (CN); EYECOOL TECHNOLOGY CO., LTD, Hebei (CN); EYECOOL TECHNOLOGY CO., LTD., Haidian District Beijing (CN)

(72) Inventors: Cheng Peng, Beijing (CN); Jun Zhou, Beijing (CN)

(73) Assignees: EYECOOL SHENZHEN TECHNOLOGY CO., LTD., Guangdong (CN); EYECOOL TECHNOLOGY CO., LTD., Hebei (CN); EYECOOL TECHNOLOGY CO., LTD., Beijing (CN)

( * ) Notice: Subject to any disclaimer, the term of this patent is extended or adjusted under 35 U.S.C. 154(b) by 445 days.

(21) Appl. No.: 17/801,087

(22) PCT Filed: Feb. 10, 2021

(86) PCT No.: PCT/CN2021/076454
§ 371 (c)(1),
(2) Date: Aug. 19, 2022

(87) PCT Pub. No.: WO2021/164678
PCT Pub. Date: Aug. 26, 2021

(65) Prior Publication Data
US 2023/0080861 A1    Mar. 16, 2023

(30) Foreign Application Priority Data
Feb. 20, 2020 (CN) .......................... 202010104872.8

(51) Int. Cl.
*G06K 9/00* (2022.01)
*G06V 40/16* (2022.01)
*G06V 40/18* (2022.01)
*G06V 40/19* (2022.01)

(52) U.S. Cl.
CPC ............ *G06V 40/16* (2022.01); *G06V 40/165* (2022.01); *G06V 40/171* (2022.01); *G06V 40/19* (2022.01); *G06V 40/193* (2022.01)

(58) Field of Classification Search
CPC .... G06V 40/16; G06V 40/165; G06V 40/171; G06V 40/19; G06V 40/193
See application file for complete search history.

(56) References Cited

U.S. PATENT DOCUMENTS

2005/0270386 A1*  12/2005  Saitoh .................... G06V 40/19
                                                                              348/239
2016/0335495 A1    11/2016  Kim et al.

FOREIGN PATENT DOCUMENTS

CN    102708357 A    10/2012
CN    102855476 A    1/2013
(Continued)

OTHER PUBLICATIONS

European Search Report from corresponding European Application No. 21757527.3 on Jan. 23, 2024.
(Continued)

*Primary Examiner* — Xin Jia
(74) *Attorney, Agent, or Firm* — Workman Nydegger (57) ABSTRACT

The present application relates to the field of biometric recognition, and disclosed in the present application are an automatic iris capturing method and apparatus, a computer-readable storage medium, and a device. The method comprises: collecting a face image by using a face imaging module; positioning a left-eye coordinate and a right-eye coordinate on the face image; calculating a central coordi-
(Continued)

nate of the two eyes according to the left-eye coordinate and the right-eye coordinate; obtaining a rotation angle of an iris imaging module according to the relationship between a prestored central coordinate of the two eyes and a prestored rotation angle; rotating the iris imaging module according to the rotation angle; and simultaneously collecting an iris image and the face image by using the iris imaging module and the face imaging module.

16 Claims, 7 Drawing Sheets

(56) References Cited

FOREIGN PATENT DOCUMENTS

| | | | | | |
|---|---|---|---|---|---|
| CN | 105095893 | A | | 11/2015 | |
| CN | 106778713 | A | * | 5/2017 | ......... G06K 9/00604 |
| CN | 108154126 | A | | 6/2018 | |
| CN | 109376729 | A | * | 2/2019 | ......... G06K 9/00604 |
| CN | 110097021 | A | | 8/2019 | |
| CN | 110210333 | A | * | 9/2019 | ............. G06V 10/22 |
| CN | 110781787 | A | | 2/2020 | |
| JP | 2005084815 | A | | 3/2005 | |
| KR | 10-1202448 | | | 11/2012 | |
| KR | 101202448 | B1 | * | 11/2012 | ........... G06V 40/165 |
| WO | 2015102361 | A1 | | 7/2015 | |

OTHER PUBLICATIONS

International Search Report dated May 19, 2021, issued in PCT Application No. PCT/CN2021/076454 dated Feb. 10, 2021.

* cited by examiner

AUTOMATIC IRIS CAPTURING METHOD AND APPARATUS, COMPUTER-READABLE STORAGE MEDIUM, AND COMPUTER DEVICE

CROSS REFERENCE TO RELATED APPLICATION

The present application claims priority to Chinese Patent Application with No. 202010104872.8, entitled "Automatic Iris Capturing Method and Apparatus, Computer-Readable Storage Medium, and Computer Device", and filed on Feb. 20, 2020, the content of which is expressly incorporated herein by reference in its entirety.

TECHNICAL FIELD

The present disclosure relates to the field of biometric identification, and particularly to an automatic iris snapshot method and apparatus, a computer-readable storage medium, and a computer device.

BACKGROUND

The structure of a human eye consists of a sclera, an iris, a pupillary lens, a retina and other components. The iris is an annular portion located between the black pupil and the white sclera, which includes many detailed characters such as interlaced spots, filaments, crowns, striations, crypts, etc. As an important identification character, the iris has advantages of lifetime uniqueness, stability, collectability, and non-invasiveness; and the iris is an inevitable trend in the development of identification research and application.

During the identification of the iris, it is necessary to quickly and accurately snapshot the iris information of the user. But the area of the human iris is smaller (about 1 cm in diameter), and the number of pixels captured in the iris area is larger (about 20 pixel/mm). Therefore, in the process of capturing the iris by a conventional iris capture device, problems of small depth of field, small range, and high cooperation degree may be faced, and it is difficult to quickly and accurately capture the required iris image.

SUMMARY

In order to address the above technical problems, the present disclosure provides an automatic iris snapshot method and apparatus, a computer-readable storage medium and a computer device, which can complete the capture of the human face image and the iris image of a user quickly, accurately, and without cooperation.

The technical solution of the preset disclosure is provided as follows.

In the first aspect of the present disclosure, an automatic iris snapshot method is provided, including:
capturing a human face image by using a human face imaging module;
positioning a left-eye coordinate and a right-eye coordinate on the human face image;
calculating a center coordinate of the double eyes according to the left-eye coordinate and the right-eye coordinate;
obtaining a rotation angle of an iris imaging module according to a pre-stored relationship between the center coordinate of the double eyes and the rotation angle;
rotating the iris imaging module according to the rotation angle;
capturing the iris image and the human face image simultaneously by using the iris imaging module and the human face imaging module.

In an embodiment, the method further includes:
before capturing the iris image and the human face image simultaneously by using the iris imaging module and the human face imaging module,
calculating a distance between the double eyes according to the left-eye coordinate and the right-eye coordinate;
obtaining a distance between the human face imaging module and a center of the double eyes according to a pre-stored relationship between the distance between the double eyes and the distance between the human face imaging module and the center of the double eyes;
focusing the iris imaging module according to the distance between the human face imaging module and the center of the double eyes.

In an embodiment, the method further includes:
before capturing the iris image and the human face image simultaneously by using the iris imaging module and the human face imaging module,
measuring a distance between a laser distance sensor and a user through the laser distance sensor;
calculating a difference between the distance from the laser distance sensor to the user and the distance from the human face imaging module to the center of the double eyes; when the difference is not within a preset range, providing an error prompt.

In an embodiment, the method further includes:
after rotating the iris imaging module according to the rotation angle,
capturing the iris image by using the iris imaging module, detecting positions of the eyes, a mouth, a nose, hair and/or eyebrows in the iris image, and rotating the iris imaging module according to the positions of the eyes, the mouth, the nose, the hair and/or the eyebrows.

In an embodiment, when only one eye is detected and the eye is located in a left part of the iris image, rotating the iris imaging module to the left by a set angle.

In an embodiment, when only one eye is detected and the eye is located in a right part of the iris image, rotating the iris imaging module to the right by a set angle.

In an embodiment, when only the mouth and/or the nose are detected, rotating the iris imaging module upward by a set angle.

In an embodiment, when only the hair and/or the eyebrows are detected, rotating the iris imaging module downward by a set angle.

In an embodiment, the relationship between the center coordinate of the double eyes and the rotation angle is obtained by:
determining a plurality of actual position coordinates, and moving the center of the double eyes to locate at the plurality of actual position coordinates sequentially;
for each actual position coordinate, adjusting the rotation angle of the iris imaging module, capturing the iris image by the iris imaging module, and imaging the double eyes at appropriate positions;
storing the plurality of actual position coordinates and the corresponding rotation angles of the iris imaging module.

In an embodiment, the relationship between the distance between the double eyes and the distance between the human face imaging module and the center of the double eyes is obtained by:

determining a plurality of actual distances between the human face imaging module and the center of the double eyes, and moving the center of the double eyes to locate at the plurality of actual distances sequentially;

for each actual distance, capturing the human face image by the human face imaging module, and acquiring the distance between the double eyes from the human face image;

storing the plurality of actual distances, and the distance between the double eyes corresponding to each of the plurality of actual distances.

In an embodiment, the storing the plurality of actual position coordinates and the corresponding rotation angles of the iris imaging module includes:

obtaining a curved surface function by fitting according to the plurality of actual position coordinates and the corresponding rotation angles of the iris imaging module, and storing the curved surface function.

In an embodiment, the storing the plurality of actual distances, and the distance between the double eyes corresponding to each of the plurality of actual distances includes:

obtaining a curvilinear function by fitting according to the plurality of actual distances and the distance between the double eyes corresponding to each of the plurality of actual distances, and storing the curvilinear function.

In an embodiment, the rotation angle includes a horizontal angle and/or a vertical angle.

In the second aspect of the present disclosure, an automatic iris snapshot apparatus is provided, including:

a human face image capture module, configured to capture a human face image by using a human face imaging module;

a double-eye coordinate positioning module, configured to position a left-eye coordinate and a right-eye coordinate on the human face image;

a double-eye center coordinate calculation module, configured to calculate a center coordinate of the double eyes according to the left-eye coordinate and the right-eye coordinate;

a rotation angle acquisition module, configured to obtain a rotation angle of an iris imaging module according to a pre-stored relationship between the center coordinate of the double eyes and the rotation angle;

a rotation module, configured to rotate the iris imaging module according to the rotation angle;

an image capture module, configured to simultaneously capture the iris image and the human face image by using the iris imaging module and the human face imaging module.

In an embodiment, the automatic iris snapshot apparatus further includes:

a double-eye distance calculation module, configured to calculate a distance between the double eyes according to the left-eye coordinate and the right-eye coordinate;

a distance acquisition module, configured to obtain a distance between the human face imaging module and the center of the double eyes according to a pre-stored relationship between the distance between the double eyes and the distance from the human face imaging module to the center of the double eyes;

a focusing module, configured to focus the iris imaging module according to the distance between the face imaging module and the center of the double eyes.

In an embodiment, the automatic iris snapshot apparatus further includes:

a distance measurement module, configured to measure a distance between a laser distance sensor and a user by the laser distance sensor;

a comparison module, configured to calculate a difference between the distance from the laser distance sensor to the user and the distance from the human face imaging module to the center of the double eyes, and provide an error prompt when the difference is not within a preset range.

In an embodiment, the automatic iris snapshot apparatus further includes:

a detection module, configured to capture the iris image by using the iris imaging module, and detect positions of eyes, a mouth, a nose, hair and/or eyebrows in the iris image, and rotate the iris imaging module according to the positions of the eyes, the mouth, the nose, the hair and/or the eyebrows.

In an embodiment, when only one eye is detected and the eye is on the left part of the iris image, the iris imaging module is rotated to the left by a set angle.

In an embodiment, when only one eye is detected and the eye is in the right part of the iris image, the iris imaging module is rotated to the right by a set angle.

In an embodiment, when only the mouth and/or nose are detected, the iris imaging module is rotated upward by a set angle.

In an embodiment, when only hair and/or eyebrows are detected, the iris imaging module is rotated downward by a set angle.

In an embodiment, the relationship between the center coordinate of the double eyes and the rotation angle is obtained by the following units:

an actual position coordinate determination unit configured to determine a plurality of actual position coordinates, and move the center of the double eyes to locate at the plurality of actual position coordinates sequentially;

a rotation angle acquisition unit configured to adjust the rotation angle of the iris imaging module for each actual position coordinate, collect the iris image through the iris imaging module, and allow the double eyes to image at an appropriate position;

a first storage unit configured to store the plurality of actual position coordinates and the corresponding rotation angles of the iris imaging module.

In an embodiment, the relationship between the distance between the double eyes and the distance from the human face imaging module and the center of the double eyes is obtained by the following units:

an actual distance determination unit configured to determine a plurality of actual distances between the human face imaging module and the center of the double eyes, and allow the center of the double eyes to position at the plurality of actual distances sequentially;

a double-eye distance acquisition unit configured to capture a human face image through the human face imaging module for each actual distance, and acquire the distance between the double eyes from the human face image;

a second storage unit configured to store the plurality of actual distances and corresponding distances between the double eyes.

In an embodiment, the first storage unit may further be configured to:

obtain a curved surface function by fitting according to the plurality of actual position coordinates and the corresponding rotation angles of the iris imaging module, and store the curved surface function.

In an embodiment, the second storage unit may further be configured to:

obtain a curvilinear function by fitting according to the plurality of actual distances and the corresponding distances between the double eyes, and store the curvilinear function.

In the third aspect of the present disclosure, a computer-readable storage medium is provided, on which a computer program is stored, the steps of the automatic iris snapshot method in the first aspect are performed when the computer program is executed by a processor.

In the fourth aspect of the present disclosure, a computer device is provided, including a processor and a memory storing a computer program, and the processor, when executing the computer program, implements the steps of the automatic iris snapshot method in the first aspect when the processor executes the computer program.

The present disclosure has the following advantages.

In the present disclosure, the center of the double eyes is positioned by using the human face image captured by the human face imaging module, and the iris imaging module is automatically rotated by the rotating head according to the center position of the double eyes, to quickly and accurately collect the human face image information and the iris image information of the user. The present disclosure can help users with different heights/distances to quickly complete the collection of the iris information, almost without any cooperation, thereby avoiding the defects that in the conventional technique the human face image and the iris image need to be captured twice and it cannot be ensured that the iris and the face information belongs to the same person.

DETAILED DESCRIPTION

In order to make the technical problems, technical solution and advantages of the present disclosure clearer, the technical solution of the present disclosure will be clearly and completely described below with reference to the accompanying drawings and specific embodiments. Obviously, the described embodiments are only some embodiments of the present disclosure, not all embodiments. The components in the embodiments of the present disclosure generally described and illustrated in the drawings herein may be arranged and designed in a variety of different configurations. Thus, the detailed description of the embodiments of the disclosure provided in the accompanying drawings is not intended to limit the scope of the disclosure as claimed, but is merely representative of selected embodiments of the present disclosure. Based on the embodiments of the present disclosure, all other embodiments obtained by those skilled in the art without creative work fall within the protection scope of the present disclosure.

Embodiment I

Figure 1:
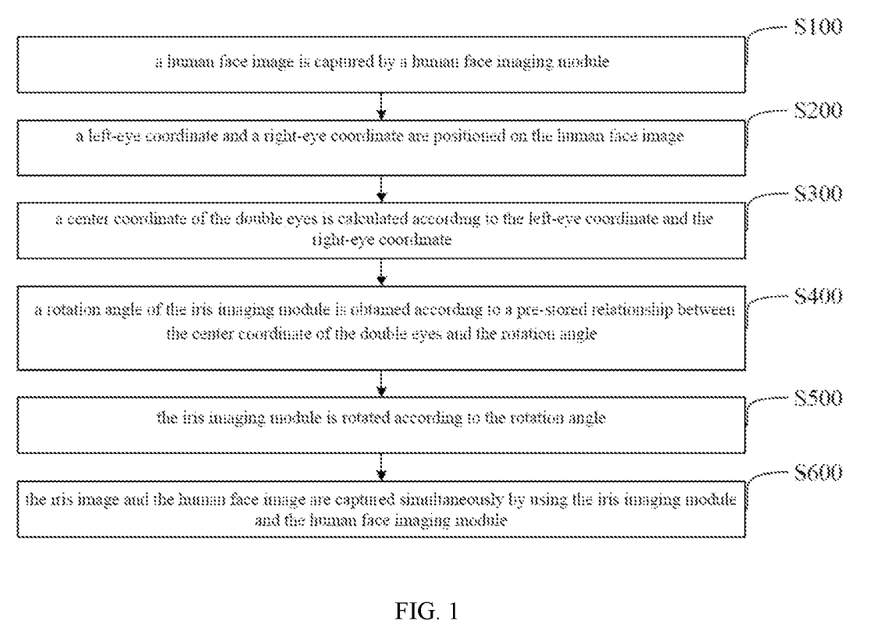
FIG. 1 is a flow chart of an automatic iris snapshot method according to an embodiment.

An automatic iris snapshot method is provided in the embodiment of the present disclosure, as shown in FIG. 1, the method includes following steps.

S100: a human face image is captured by a human face imaging module.

Since the iris image is an image of an eye area on the human face, the capture of the iris information can be positioned through an assistance of the face area, so that in the present disclosure the human face image is first captured through the human face imaging module.

The human face imaging module is mounted in a fixed position and does not move. A field angle of the human face imaging module is larger, and a camera coverage at a distance of one meter can cover the face area of people with a height of 1.2 meters to 2.2 meters. When the user appears within three meters in front of the human face imaging module, the human face imaging module automatically captures the human face image of the user. In an embodiment, the human face imaging module includes a face lens, an image sensor (CMOS/CCD), and a circuit board (PCBA). The face lens is configured to transmit an optical signal obtained by optically processing the captured face image to the image sensor; the image sensor is configured to process the received optical signal to obtain an electrical signal, and finally transmit the electrical signal to the circuit board for data compression and other processing.

S200: a left-eye coordinate and a right-eye coordinate are positioned on the human face image.

In the step, through the face detection and positioning algorithm, the face is quickly positioned, and the coordinates of the eyes (left-eye coordinate (x1, y1), right-eye coordinate (x2, y2)) are provided.

In the step, the face detection can be performed on the human face image by using the SSD face detector, and then a Multi-task Cascaded Convolutional Networks (MTCNN) method can be performed on the acquired face image; the method can simultaneously perform the face detection and key point positioning, e.g., five key points can be obtained, namely a center point of the left eye, a center point of the right eye, a nasal tip point, a left corner point of the mouth and a right corner point of the mouth. It should be noted that the face detector is not limited to using the SSD algorithm, but can also use algorithms such as Character Region Awareness for Text Detection (CRAFT) and Adaptive Boosting (ADABOOST). Similarly, the face key point positioning method is not limited to the use the MTCNN, but also methods such as Supervised Descent Method (SDM), etc. In the step only the coordinates of the double eyes in the human face image need to be acquired.

S300: a center coordinate of the double eyes is calculated according to the left-eye coordinate and the right-eye coordinate.

The center coordinate of the double eyes is denoted as (x', y'), where x'=(x1+x2)/2, y'=(y1+y2)/2; x1 represents an abscissa of the left eye, and y1 represents an ordinate of the left eye; x2 represents an abscissa of the right eye, and y2 represents an ordinate of the right eye.

S400: a rotation angle of the iris imaging module is obtained according to a pre-stored relationship between the center coordinate of the double eyes and the rotation angle, in which the rotation angle includes a horizontal angle (x3°) and a vertical angle (y3°).

In an embodiment, the iris imaging module includes an iris lens, an image sensor (CMOS/CCD), and a circuit board (PCBA); the iris lens is configured to transmit the optical signal obtained by optically processing the captured iris image to the image sensor; the image sensor is configured to process the received optical signal to obtain the electrical signal, and finally transmit the electrical signal to the circuit board for data compression or other processing.

The center coordinate of the double eyes can quantitatively represent a position of the user, that is, a relative position relationship between the user and the imaging module, and it is possible to know how to adjust the iris imaging module according to the relative position between the user and the imaging module.

In the present disclosure, the corresponding relationship between the center coordinate of the double eyes and the rotation angle is pre-stored. After the center coordinate of the double eyes is calculated, an angle at which the iris imaging module needs to be rotated can be obtained according to the pre-stored corresponding relationship; and the rotation angle includes angles in both directions, namely the horizontal angle and the vertical angle.

S500: the iris imaging module is rotated according to the rotation angle.

The iris imaging module is mounted on a rotating head and can be rotated up and down (at the vertical angle) or left and right (at the horizontal angle). The iris imaging module is rotated according to the rotation angle obtained above, so that the double eyes can be imaged at the appropriate positions in the image.

In an embodiment, the above-mentioned appropriate position may be an optimal capture position of the iris imaging module, and the optimal capture position is a calibration position preset by a factory.

S600: the iris image and the human face image are captured simultaneously by using the iris imaging module and the human face imaging module.

In the step, when the iris imaging module captures the iris image, the human face imaging module captures the human face image at the same time; and the captured iris image and face image are used for the subsequent iris identification and authentication, and the face identification and authentication.

The conventional face and iris captures need to be performed twice and cannot ensure that the iris and face information are information of the same person. In the present disclosure, after the iris imaging module is rotated, the iris imaging module and the human face imaging module are utilized to capture the iris image and the human face image at the same time, thereby avoiding the defects that in the conventional technique the human face and iris images need to be captured twice and it cannot be ensured that the iris and the face information belongs to the same person. In addition, the iris image and the human face image can be identified and compared simultaneously, which can further improve the identification accuracy without adding an additional action coordination.

In the present disclosure, the center position of the double eyes is determined by using the human face image captured by the human face imaging module, and the iris imaging module is automatically rotated by the rotating head according to the center position of the double eyes, so that the user's face and iris image information is collected quickly and accurately. This disclosure can help users with different heights/distances to quickly complete the collection of iris information, almost without any cooperation, thereby avoiding that in the conventional technique the human face and iris images need to be captured twice and it cannot be ensured that the iris and face information belongs to the same person.

The iris imaging module in the present disclosure is an auto-focusing module; and after rotating in place, the iris imaging module further performs the auto-focusing function. In an embodiment, auto-focusing is implemented by a combination of lenses such as a convex lens and a concave lens, etc., in the iris lens. The method of the present disclosure further includes the following steps.

S110: a distance between the double eyes is calculated according to the left-eye coordinate and the right-eye coordinate.

Generally, the distance between the double eyes is represented by the number of pixels between the double eyes on the face. The left eye and the right eye are generally at the same height. Therefore, the distance between the double eyes is equal to $m=|x1-x2|$, where x1 is the abscissa of the left eye, x2 is the abscissa of the right eye, and the unit is pixel (pix).

S210: the distance between the human face imaging module and the center of the double eyes is obtained according to the pre-stored relationship between the distance between the double eyes and the distance between the human face imaging module and the center of the double eyes.

According to the imaging principle that "everything looks small in the distance and big on the contrary", for the same human face imaging module, if the distance between the double eyes is large, the user is close to the human face imaging module; if the distance between the double eyes is small, the user is far from the human face imaging module. Therefore, the distance between the human face imaging module and the center of the double eyes can be determined according to the distance between the double eyes.

The specific method includes: the relationship between the distance between the double eyes and the distance from the human face imaging module to the center of the double eyes is pre-stored, and then the distance between the human face imaging module and the center of the double eyes can be obtained according to the corresponding relationship and the calculated distance between the double eyes. The distance between the human face imaging module and the center of the double eyes can be denoted as a symbol n in centimeters (cm).

S310: the iris imaging module is focused according to the distance between the human face imaging module and the center of the double eyes.

After the human face imaging module rotates and finds a focal point of the eye area of the user, the fast auto-focusing is performed according to the distance information n obtained in the previous step and with the assistance of the image clarity determination algorithm to automatically focus and capture a clear iris image.

The above-mentioned steps S110 to S310 are sequentially performed, and the steps S110 to S310 are performed between the steps S200 and S600, and the step S310 is performed after the step S500.

As an improvement of the present disclosure, before the step S600, the method further includes following steps.

S120: a distance between a laser distance sensor and the user is measured through the laser distance sensor.

The distance is a straight-line distance between the laser distance sensor and the user, and can be denoted by a symbol z in centimeters (cm).

S220: a difference between the distance from the laser distance sensor to the user and the distance from the human face imaging module to the center of the double eyes is calculated; when the difference is not within a preset range, an error prompt is provided.

In an embodiment, the difference between the distance from the laser distance sensor to the user and the distance from the human face imaging module to the center of the double eyes is calculated, and it is determined whether the difference is within the preset range. If the difference is within the preset range, it means that the distance between the human face imaging module and the center of the double eyes is correct; otherwise, an error prompt is provided.

In the step, the value z of the straight-line distance between the laser distance sensor and the user returned by the laser distance sensor serves as an auxiliary determination value. If the difference between z and n is larger, it means that an abnormality occurs, and a voice prompt of a operation specification can be provided and the value of n is recalculated; otherwise, it means that it is normal, and the obtained distance n between the human face imaging module and the center of the double eyes is correct.

The above-mentioned steps S120 to S220 are performed sequentially, and the steps S120 to S220 are performed between the steps S100 and S600, and the step S220 is performed after the step S210.

If the iris is not in the accurate focus position after the iris imaging module is rotated to focus, secondary correction and fine turning can be performed through partial face information captured by the iris lens. At this time, after the step S500, the method further includes:

S510: an iris image is captured by using an iris imaging module, and positions of the eyes, mouth, nose, hair and/or eyebrows in the iris image are detected through a detection and positioning algorithm, and the iris imaging module is rotated according to the positions of the eyes, mouth, nose, hair and/or eyebrows.

In an embodiment, when only one eye is detected and the eye is located on the left part of the iris image, the iris imaging module is rotated to the left by a set angle.

In an embodiment, when only one eye is detected and the eye is located on the right part of the iris image, the iris imaging module is rotated to the right by a set angle.

In an embodiment, when only the mouth and/or the nose is detected (that is, no eye is currently detected), the iris imaging module is rotated upward by a set angle.

In an embodiment, when only hair and/or eyebrows is detected (that is, no eye is currently detected), the iris imaging module is rotated downward by a set angle.

The aforementioned set angle is determined according to actual conditions such as the characteristics of the iris imaging module, and may be, for example, 2°. In an embodiment, the set angle can be determined according to the field angle of the iris lens. For example, the field angle of the iris imaging lens is 33°, and the set angle is 2°. When the field angle of the iris imaging lens is equal to other angles, a new set angle can be obtained according to an equal ratio relationship.

In the present disclosure, since the field angle and the number of pixels of a different human face imaging module may differ, after the human face imaging module is determined, different actual positions of the user can be set to calibrate the data calculation method of x3° and y3°. That is, the relationship between the center coordinate of the double eyes and the rotation angle is obtained through the following steps.

S1: a plurality of actual position coordinates are determined, and the center of the double eyes is moved to locate at the plurality of actual position coordinates sequentially.

Figure 2:
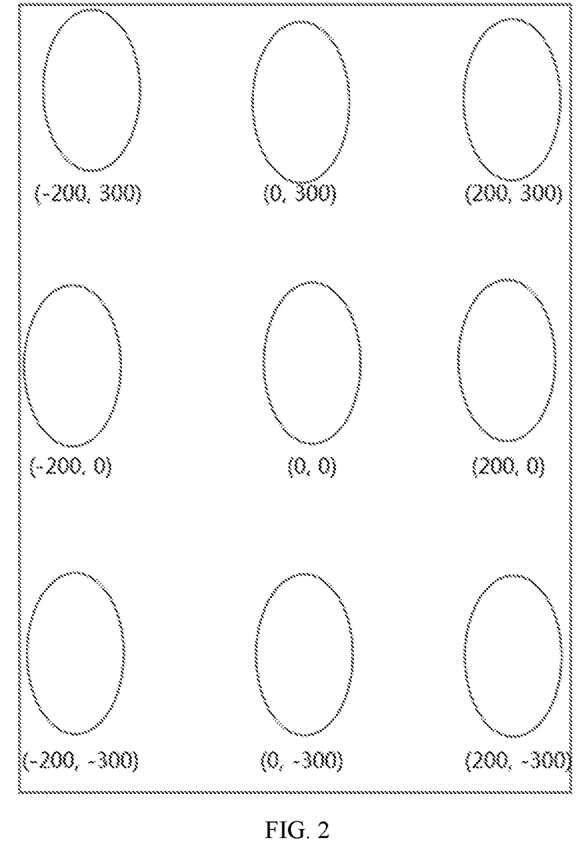
FIG. 2 is an example diagram illustrating nine groups of actual position coordinates.

For example, as shown in FIG. 2, nine groups of position coordinates are determined by actually measuring, namely (up (0, 300), down (0, −300), left (200, 0), right (−200, 0), upper left (−200, 300), upper right (200, 300), lower left (−200, −300), lower right (200, −300), (0, 0)). The center position of the double eyes of the user is moved to these nine groups of positions sequentially.

S2: For each actual position coordinate, the rotation angle of the iris imaging module is adjusted, the iris image is captured through the iris imaging module, and the double eyes are imaged at appropriate positions.

The values of the rotation angle (x3°, y3°) corresponding to the nine groups of positions are calculated respectively, for example, namely (0°, 30°), (0°, −30°), (−20°, 0°), (20°, 0°), (−20°, 30°), (20°, 30°), (−20°, −30°), (20°, −30°), (0°, 0°).

S4: the plurality of actual position coordinates and the corresponding rotation angles of the iris imaging module are stored.

The above stored corresponding relationship serves as the relationship between the center coordinate of the double eyes and the rotation angle, and deduction is performed according to the corresponding relationship. Assuming that the user comes to the device, the center coordinate of the double eyes acquired is (150, 200), and referring to the value of upper right (200, 300)-(20°, 30°), the rotation angle is (15°, 20°).

In the step, a curved surface function can be obtained by fitting according to the plurality of actual position coordinates and the corresponding rotation angles of the iris imaging module, and the curved surface function is stored.

For example, by performing surface fitting through the aforementioned nine groups of positions and corresponding rotation angle values, a curved surface function can be obtained, and the curved surface function is be stored as the aforementioned relationship between the center coordinate of the double eyes and the rotation angle.

In the present disclosure, since the field angle and the number of pixels of a different human face imaging module are different, after the parameters of the human face imaging module are determined, different actual distance positions can be set, and the number of pixels m (pix) between the double eyes at the current distance can be calculated synchronously to calibrate the data calculation method of n (cm). That is, the relationship between the distance between the double eyes and the distance from the human face imaging module to the center of the double eyes is obtained through the following steps.

S1': a plurality of actual distances between the human face imaging module and the center of the double eyes is determined, and the center of the double eyes is moved to locate at the plurality of actual distances sequentially.

For example, nine distance data (100 cm, 120 cm, 150 cm, 180 cm, 200 cm, 220 cm, 250 cm, 280 cm, 300 cm) between the center of the double eyes of the user and the human face imaging module are actually measured, and the user moves to the positions corresponding to the nine data in sequence.

S2': for each actual distance, the human face image is captured by the human face imaging module, and the distance between the double eyes is acquired from the human face image.

For example, difference values m (pix) between the numbers of pixels of the double eyes are calculated respectively, which are (100 pix, 95 pix, 92 pix, 88 pix, 85 pix, 80 pix, 72 pix, 65 pix, 60 pix).

S3': the plurality of actual distances, and the distance between the double eyes corresponding to each of the plurality of actual distances are stored.

The above stored corresponding relationship serves as the aforementioned relationship between the distance between the double eyes and the distance from the human face imaging module to the center of the double eyes. Deduction is performed according to the corresponding relationship, assuming that the user comes to the device, the difference value between the numbers of pixels of the double eyes obtained through the acquired face image is equal to m=86 pix, so that the distance between the user and the lens is about equal to n=190 cm.

In the step, a curvilinear function can also be obtained by fitting according to the plurality of actual distances and the distance between the double eyes corresponding to each of the plurality of actual distances, and the curvilinear function is stored.

For example, by performing the curve fitting according to the aforementioned nine actual distances and the corresponding distances between the double eyes, a curvilinear function can be obtained, and the curvilinear function is stored as the relationship between distance between the double eyes and the distance from the human face imaging module to the center of the double eyes.

Embodiment II

Figure 3:
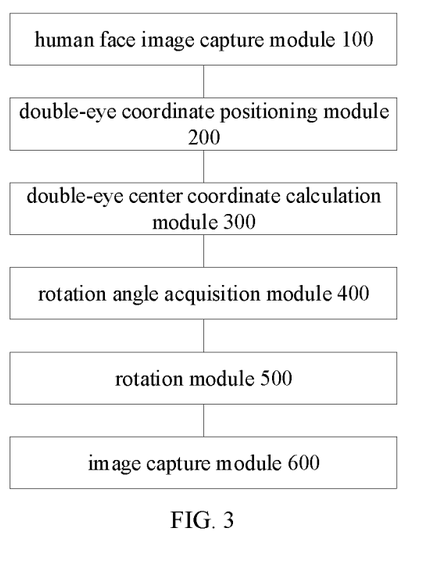
FIGS. 3-6 are respectively schematic diagrams illustrating different examples of automatic iris snapshot apparatus according to the present disclosure.

In the embodiment of the present disclosure, an iris automatic snapshot apparatus is provided, as shown in FIG. 3, the device includes:
- a human face image capture module 100 configured to capture a human face image by using a human face imaging module;
- a double-eye coordinate positioning module 200 configured to position a left-eye coordinate and a right-eye coordinate on the human face image;
- a double-eye center coordinate calculation module 300 configured to calculate a center coordinate of the double eyes according to the left-eye coordinate and the right-eye coordinate;
- a rotation angle acquisition module 400 configured to obtain a rotation angle of an iris imaging module according to a pre-stored relationship between the center coordinate of the double eyes and the rotation angle, in which the rotation angle includes a horizontal angle and a vertical angle;
- a rotation module 500 configured to rotate the iris imaging module according to the rotation angle;
- an image capture module 600 configured to simultaneously capture the iris image and the human face image by using the iris imaging module and the human face imaging module.

In the present disclosure, the center position of the double eyes is located by using the human face image captured by the human face imaging module, and the iris imaging module is automatically rotated through the rotating head according to the center position of the double eyes, to quickly and accurately collect the human face image and iris image information of the user. The present disclosure can help users with different heights/distances to quickly complete the collection of the iris information, almost without any cooperation, thereby avoiding the defects in the conventional technique that the human face and iris images need to be captured twice and it cannot be ensured that the information of the iris and humane face belongs to the same person.

Figure 4:
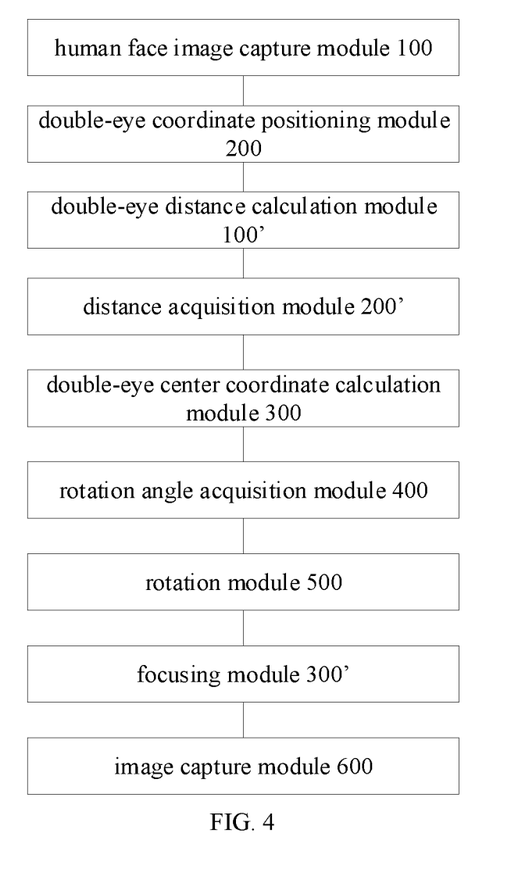

The iris imaging module in the present disclosure is an auto-focusing module; and after rotated in place, the auto-focusing function of the iris imaging module is further performed. As shown in FIG. 4, the device in the present disclosure further includes:

- a double-eye distance calculation module 110 configured to calculate a distance between the double eyes according to the left-eye coordinate and the right-eye coordinate;
- a distance acquisition module 210 configured to obtain a distance between the human face imaging module and the center of the double eyes according to the pre-stored relationship between the distance between the double eyes and the distance from the human face imaging module to the center of the double eyes;
- a focusing module 310 configured to focus the iris imaging module according to the distance between the face imaging module and the center of the double eyes.

Figure 5:
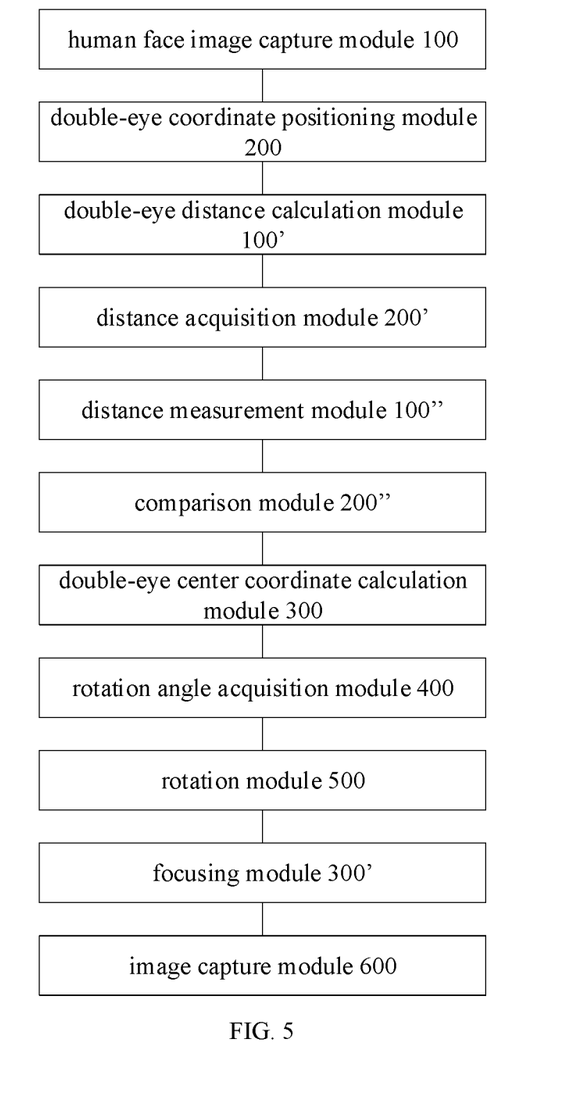

In an embodiment, as shown in FIG. 5, the iris automatic snapshot apparatus further includes:
- a distance measurement module 120 configured to measure a distance between a laser distance sensor and the user by the laser distance sensor;
- a comparison module 220 configured to calculate a difference between the distance from the laser distance sensor to the user and the distance from the human face imaging module to the center of the double eyes, in which when the difference is not within a preset range, an error prompt is provided.

Figure 6:
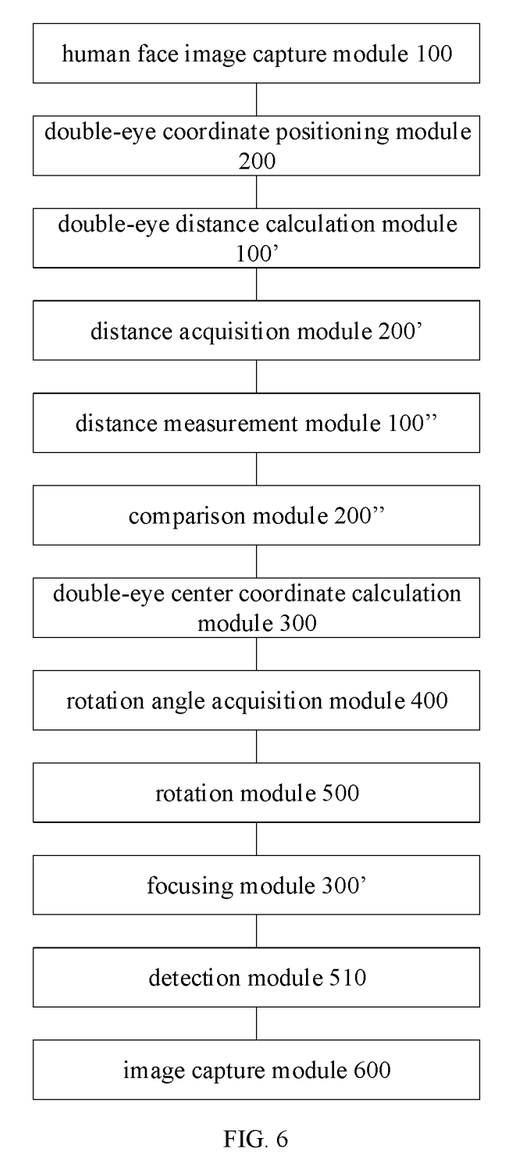

If the iris is not in the correct focus position after the iris imaging module is rotated to focus, the secondary correction and fine turning can be performed through partial face information captured by the iris lens. As shown in FIG. 6, the iris automatic snapshot apparatus further includes:
- a detection module 510 configured to capture the iris image by using the iris imaging module, and detect positions of eyes, a mouth, a nose, hair and/or eyebrows in the iris image, and rotate the iris imaging module according to the positions of the eyes, the mouth, the nose, the hair and/or the eyebrows.

In an embodiment, when only one eye is detected and the eye is on the left part of the iris image, the iris imaging module is rotated to the left by a set angle.

In an embodiment, when only one eye is detected and the eye is in the right part of the iris image, the iris imaging module is rotated to the right by a set angle.

In an embodiment, when only the mouth and/or nose are detected, the iris imaging module is rotated upward by a set angle.

In an embodiment, when only hair and/or eyebrows are detected, the iris imaging module is rotated downward by a set angle.

In an embodiment, the relationship between the center coordinate of the double eyes and the rotation angle is obtained by the following units:
- an actual position coordinate determination unit configured to determine a plurality of actual position coordinates, and move the center of the double eyes to locate at the plurality of actual position coordinates sequentially;
- a rotation angle acquisition unit configured to adjust the rotation angle of the iris imaging module for each actual position coordinate, collect the iris image through the iris imaging module, and allow the double eyes to image at an appropriate position;
- a first storage unit configured to store the plurality of actual position coordinates and the corresponding rotation angles of the iris imaging module.

The first storage unit can further be configured to:
obtain a curved surface function by fitting according to the plurality of actual position coordinates and the corresponding rotation angles of the iris imaging module, and store the curved surface function.

In an embodiment, the relationship between the distance between the double eyes and the distance from the human face imaging module and the center of the double eyes is obtained by the following units:

an actual distance determination unit configured to determine a plurality of actual distances between the human face imaging module and the center of the double eyes, and allow the center of the double eyes to position at the plurality of actual distances sequentially;

a double-eye distance acquisition unit configured to capture a human face image through the human face imaging module for each actual distance, and acquire the distance between the double eyes from the human face image;

a second storage unit configured to store the plurality of actual distances and corresponding distances between the double eyes.

In an embodiment, the second storage unit may further be configured to:

obtain a curvilinear function by fitting according to the plurality of actual distances and the corresponding distances between the double eyes, and store the curvilinear function.

The implementation principle and the technical effects of the apparatus provided in the embodiment of the present disclosure are the same as that in the foregoing method embodiment I. For the sake of brief description, for the parts not mentioned in the embodiment of the apparatus, reference can be made to the corresponding content in the foregoing method embodiment I. Those skilled in the art can clearly understand that, for the convenience and brevity of description, the specific operation processes of the above-described apparatus and units can be referred to the corresponding processes in the method embodiment I, and details are not repeated here.

Embodiment III

The method described in the embodiment I provided in the specification can implement business logic through a computer program and record it on a storage medium, and the storage medium can be read and executed by a computer to achieve the effects of the solution described in the embodiment I of the specification. Therefore, the present disclosure further provides a computer-readable storage medium on which a computer program is stored, and when the computer program is executed by a processor, the steps of the automatic iris snapshot method in the embodiment I are implemented.

In the present disclosure, the center of the double eyes is positioned by using the human face image captured by the human face imaging module, and the iris imaging module is automatically rotated by the rotating head according to the center position of the double eyes, to quickly and accurately collect the human face image information and the iris image information of the user. The present disclosure can help users with different heights/distances to quickly complete the collection of the iris information, almost without any cooperation, thereby avoiding in the conventional technique that the human face and iris images need to be captured twice and it cannot be ensured that the information of the iris and humane face belongs to the same person.

The computer-readable storage medium may include a physical device configured to store information, which usually digitizes the information before storing it in a medium using electrical, magnetic or optical means. The computer-readable storage medium may include: devices that use electrical energy to store information, such as various memories, for example, RAM, ROM, etc.; devices that use magnetic energy to store information, such as hard disks, floppy disks, magnetic tapes, magnetic core memories, magnetic bubbles Memory, U disk; devices that store information optically, such as CDs or DVDs. Of course, there are other readable storage media, such as a quantum memory, a graphene memory, and so on.

The above-mentioned apparatus may further have other embodiments according to the description of method embodiment I. For a specific embodiment, reference can be made to the description of the related method embodiment I, which will not be repeated here.

Embodiment IV

Figure 7:
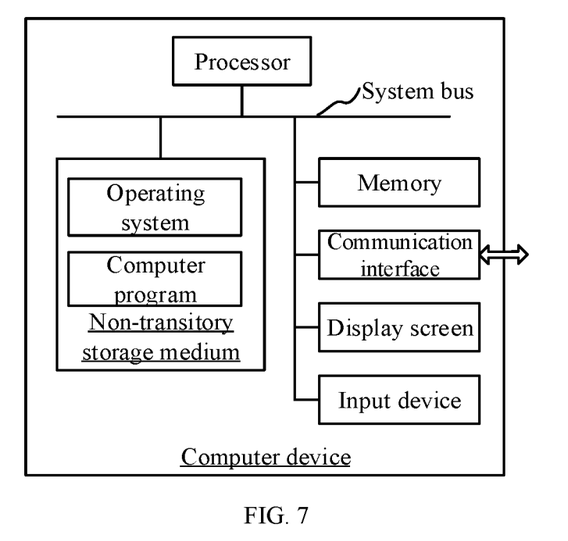
FIG. 7 is an internal structure diagram of a computer device according to an embodiment.

The present disclosure also provides a computer device as shown in FIG. 7. The computer device may be a separate computer, or may include an actual operation device using one or more of the methods or one or more apparatus in the embodiments of the present disclosure, etc., and the internal structure diagram can be shown as FIG. 7. The computer device includes a processor, a memory, a communication interface, a display screen, and an input device connected by a system bus. The processor of the computer device is configured to provide computing and control capabilities. The memory of the computer device includes a non-transitory storage medium, an internal memory. The non-transitory storage medium stores an operating system and a computer program. The internal memory provides an environment for the execution of the operating system and computer programs in the non-transitory storage medium. The communication interface of the computer device is configured to perform a wired or wireless communication with an external terminal; and the wireless communication can be realized by WIFI, an operator network, Near Field Communication (NFC) or other technologies. An automatic iris snapshot method is implemented when the computer program is executed by the processor. The display screen of the computer device can be a liquid crystal display screen or an electronic ink display screen; and the input device of the computer device may be a touch layer covering the display screen, or a button, a trackball or a touchpad provided on the housing of the computer device, or an external keyboard, trackpad, or mouse, etc.

Those skilled in the art can understand that the structure shown in FIG. 7 is only a block diagram of a partial structure related to the solution of the present disclosure, and does not constitute a limitation on the computer device to which the solution of the present disclosure is applied. A specific computer device may include more or fewer components than shown in the figures, or combine certain components, or have a different arrangement of components.

In the present disclosure, the center of the double eyes is positioned by using the human face image collected by the human face imaging module, and the iris imaging module is automatically rotated by the rotating head according to the center position of the double eyes, to quickly and accurately collect the human face image information and iris image information of the user. The present disclosure can help users with different heights/distances to quickly complete the collection of the iris information, almost without any cooperation, thereby avoiding that in the conventional technique the human face and iris images need to be captured twice and it cannot be ensured that the iris and face information belongs to the same person.

The above-mentioned device may also have other embodiments according to the description of the method or apparatus embodiment. For a specific embodiment, reference can be made to the description of the related method embodiment I, which will not be repeated here.

It should be noted that the above-mentioned apparatus or system in this specification may also include other embodiments according to the description of the related method embodiments; for a specific embodiment, reference can be made to the description of the method embodiments, which will not be repeated here. Each embodiment in this specification is described in a progressive manner, and the same and similar parts between the various embodiments may be referred to each other, and each embodiment focuses on the differences from other embodiments. In particular, for the hardware+program class, storage medium+program embodiment, since it is basically similar to the method embodiment, the description is relatively simple, for the relevant parts, reference can be made to the partial description of the method embodiment.

The specific embodiments of the present disclosure are provided in the above. Other embodiments are within the scope of the appended claims. In some cases, the actions or steps recited in the claims can be performed in an order different from that in the embodiments and still achieve the desirable results. Additionally, the processes depicted in the figures do not definitely require the particular order shown, or sequential order to achieve desirable results. In some embodiments, multitasking and parallel processing are also possible or may be advantageous.

The systems, apparatus, modules or units described in the above embodiments may be specifically implemented by a computer chip or an entity, or by a product with certain functions. A typical implementation device is a computer. Specifically, the computer can be, for example, a personal computer, a laptop computer, an in-vehicle human-computer interaction device, a cellular phone, a camera phone, a smart phone, a personal digital assistant, a media player, a navigation device, an email device, a game console, a tablet computer, a wearable device, or a combination of any of these devices.

For the convenience of description, when describing the above apparatus, the functions are divided into various modules and described respectively. Of course, when one or more embodiments in this specification are implemented, the function of each module can be implemented in the same one or more software and/or hardware; alternatively, the modules that implement the same function can also be implemented by a combination of multiple sub-modules or sub-units, etc. The apparatus embodiments described above are only illustrative. For example, the division of the units is only a logical function division. In actual implementation, there may be other division manners. For example, multiple units or components may be combined or integrated to another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

Those skilled in the art also know that, in addition to implementing the controller in the form of pure computer-readable program code, the controller can implement the same function in the form of logic gates, switches, application-specific integrated circuits, programmable logic controllers and embedded devices by logically programming the method steps. Therefore, such controller can be regarded as a hardware component, and the apparatus included in the controller configured to implement various functions can also be regarded as a structure inside the hardware component. Or even, the apparatus configured to implement various functions can be regarded as both a software module implementing a method and a structure within a hardware component.

The present disclosure is described with reference to flow charts and/or block diagrams of the methods, apparatus (systems), and computer program products according to embodiments of the present disclosure. It will be understood that each process in the flow charts and/or each block diagram in the block diagrams, and a combination of a process in the flow charts and/or a block diagram in the block diagrams can be implemented by computer program instructions. These computer program instructions may be provided to the processor of a general purpose computer, a special purpose computer, an embedded processor or other programmable data processing device to produce a machine, such that the instructions executed by the processor of the computer or other programmable data processing device produce an apparatus for implementing the functions specified in a process or multiple processes and/or a block diagram or multiple block diagrams.

These computer program instructions may also be stored in a computer-readable memory capable of directing a computer or other programmable data processing devices to function in a particular manner, such that the instructions stored in the computer-readable memory produce a manufactured item comprising the instruction apparatus; the instruction apparatus implements the functions specified in a process or multiple processes and/or a block diagram or multiple block diagrams.

These computer program instructions can also be loaded on a computer or other programmable data processing devices to cause a series of operating steps to be performed on the computer or other programmable devices to produce computer-implemented processing, such that the instructions provide steps for implementing the functions specified in a process or multiple processes and/or a block diagram or multiple block diagrams.

In a typical configuration, a computing device includes one or more central processing units (CPUs), an input/output interface, a network interface, and a memory.

It should also be noted that the terms "comprising", "including" or any other variations thereof are intended to encompass a non-exclusive inclusion such that a process, method, article or device comprising a series of elements includes not only those elements, but also other elements not expressly listed, or includes the elements which are inherent to such a process, method, article of manufacture, or device. Without further limitation, an element defined by the phrase "comprising a . . . " does not exclude the presence of additional identical elements in the process, method, or device that includes the element.

Those skilled in the art can understand that one or more embodiments of the specification may be provided as a method, system or computer program product. Accordingly, one or more embodiments in this specification may take the form of an entirely hardware embodiment, an entirely software embodiment, or an embodiment combining software and hardware aspects. Furthermore, one or more embodiments in the present specification may employ a form of a computer program product implemented on one or more computer available storage media (including, but not limited to, a disk storage, a CD-ROM, an optical storage, etc.) having computer available program codes.

One or more embodiments in this specification may be described in the general context of computer-executable instructions executed by a computer, such as program modules. Generally, a program module includes routines, programs, objects, components, data structures, etc., that perform particular tasks or implement particular abstract data types. Alternatively, one or more embodiments in the present specification may also be practiced in a distributed computing environment where the tasks are performed by a remote processing device linked through a communications network. In the distributed computing environment, the program module may be located in both local and remote computer storage media including the storage device.

Each embodiment in the specification is described in a progressive manner, and the same or similar parts between the various embodiments may be referred to each other, and each embodiment focuses on the differences from other embodiments. In particular, for the system embodiments, since they are basically similar to the method embodiments, the description is relatively simple, and for related parts, reference can be made to the partial descriptions of the method embodiments. In the description of the specification, description with reference to the terms "one embodiment", "some embodiments" "example", "specific example" or "some examples", etc., refers to that specific features, structures, materials or characteristics described in combination with the embodiments or examples are included in at least one embodiment or example in this specification. In this specification, schematic expressions of the above terms are not definitely directed to the same embodiments or examples. Furthermore, the particular features, structures, materials or characteristics described may be combined in any appropriate manner in any one or more embodiments or examples. Furthermore, those skilled in the art may combine and assemble the different embodiments or examples, as well as the features in the different embodiments or examples described in this specification, without conflicting each other.

Finally, it should be noted that the above-mentioned embodiments are merely some specific embodiments of the present disclosure, and are used for illustrating the technical solution of the present disclosure, rather than limiting it, and the protection scope of the present disclosure is not limited to this. Although the present disclosure is detailed with reference to the aforementioned embodiments, those of ordinary skill in the art should understand that: any person skilled in the art can still modify or transform the technical solutions described in the foregoing embodiments, or equivalent replacements are made to some of the technical feature within the technical scope of the present disclosure; and these modifications, transformations or replacements do not make the essence of the corresponding technical solution deviate from the spirit and scope of the technical solution of the embodiment of the present disclosure, and which all should fall within the scope of protection of the present disclosure. Therefore, the protection scope of the present disclosure should be subject to the protection scope of the claims.

What is claimed is:

1. An automatic iris snapshot method, comprising:
    capturing a human face image by using a human face imaging module;
    positioning a left-eye coordinate and a right-eye coordinate on the human face image;
    calculating a center coordinate of the double eyes according to the left-eye coordinate and the right-eye coordinate;
    obtaining a rotation angle of an iris imaging module according to a pre-stored relationship between the center coordinate of the double eyes and the rotation angle;
    rotating the iris imaging module according to the rotation angle;
    capturing the iris image and the human face image simultaneously by using the iris imaging module and the human face imaging module;
    further comprising:
    after rotating the iris imaging module according to the rotation angle,
    capturing the iris image by using the iris imaging module, detecting positions of the eyes, a mouth, a nose, hair and/or eyebrows in the iris image, and rotating the iris imaging module according to the positions of the eyes, the mouth, the nose, the hair and/or the eyebrows.

2. The automatic iris snapshot method according to claim 1, further comprising:
    before capturing the iris image and the human face image simultaneously by using the iris imaging module and the human face imaging module,
    calculating a distance between the double eyes according to the left-eye coordinate and the right-eye coordinate;
    obtaining a distance between the human face imaging module and a center of the double eyes according to a pre-stored relationship between the distance between the double eyes and the distance between the human face imaging module and the center of the double eyes;
    focusing the iris imaging module according to the distance between the human face imaging module and the center of the double eyes.

3. The automatic iris snapshot method according to claim 2, further comprising:
    before capturing the iris image and the human face image simultaneously by using the iris imaging module and the human face imaging module,
    measuring a distance between a laser distance sensor and a user through the laser distance sensor;
    calculating a difference between the distance from the laser distance sensor to the user and the distance from the human face imaging module to the center of the double eyes; when the difference is not within a preset range, providing an error prompt.

4. The automatic iris snapshot method according to claim 1 wherein when only one eye is detected and the eye is located in a left part of the iris image, rotating the iris imaging module to the left by a set angle.

5. The automatic iris snapshot method according to claim 1, wherein when only one eye is detected and the eye is located in a right part of the iris image, rotating the iris imaging module to the right by a set angle.

6. The automatic iris snapshot method according to claim 1 wherein when only the mouth and/or the nose are detected, rotating the iris imaging module upward by a set angle.

7. The automatic iris snapshot method according to claim 1, wherein when only the hair and/or the eyebrows are detected, rotating the iris imaging module downward by a set angle.

8. The automatic iris snapshot method according to claim 1, wherein the relationship between the center coordinate of the double eyes and the rotation angle is obtained by:

determining a plurality of actual position coordinates, and moving the center of the double eyes to locate at the plurality of actual position coordinates sequentially;

for each actual position coordinate, adjusting the rotation angle of the iris imaging module, capturing the iris image by the iris imaging module, and imaging the double eyes at appropriate positions;

storing the plurality of actual position coordinates and the corresponding rotation angles of the iris imaging module.

9. The automatic iris snapshot method according to claim 8, wherein the storing the plurality of actual position coordinates and the corresponding rotation angles of the iris imaging module comprises:

obtaining a curved surface function by fitting according to the plurality of actual position coordinates and the corresponding rotation angles of the iris imaging module, and storing the curved surface function.

10. The automatic iris snapshot method according to claim 1, wherein, the relationship between the distance between the double eyes and the distance between the human face imaging module and the center of the double eyes is obtained by:

determining a plurality of actual distances between the human face imaging module and the center of the double eyes, and setting the center of the double eyes to locate at the plurality of actual distances sequentially;

for each actual distance, capturing the human face image by the human face imaging module, and acquiring the distance between the double eyes from the human face image;

storing the plurality of actual distances, and the distance between the double eyes corresponding to each of the plurality of actual distances.

11. The automatic iris snapshot method according to claim 10, wherein the storing the plurality of actual distances, and the distance between the double eyes corresponding to each of the plurality of actual distances comprises:

obtaining a curvilinear function by fitting according to the plurality of actual distances and the distance between the double eyes corresponding to each of the plurality of actual distances, and storing the curvilinear function.

12. The automatic iris snapshot method according to claim 1, wherein the rotation angle comprises a horizontal angle and/or a vertical angle.

13. A non-transitory computer-readable storage medium on which a computer program is stored, wherein the steps of the automatic iris snapshot method according to claim 1 are performed when the computer program is executed by a processor.

14. A computer device, comprising a processor and a memory storing a computer program, wherein the processor, when executing the computer program, implements the steps of the automatic iris snapshot method according to claim 1 when the processor executes the computer program.

15. An automatic iris snapshot apparatus, comprising:

a human face image capture module, configured to capture a human face image by using a human face imaging module;

a double-eye coordinate positioning module, configured to position a left-eye coordinate and a right-eye coordinate on the human face image;

a double-eye center coordinate calculation module, configured to calculate a center coordinate of the double eyes according to the left-eye coordinate and the right-eye coordinate;

a rotation angle acquisition module, configured to obtain a rotation angle of an iris imaging module according to a pre-stored relationship between the center coordinate of the double eyes and the rotation angle;

a rotation module, configured to rotate the iris imaging module according to the rotation angle;

an image capture module, configured to simultaneously capture the iris image and the human face image by using the iris imaging module and the human face imaging module;

further comprising:

a detection module, configured to capture the iris image by using the iris imaging module, and detect positions of eyes, a mouth, a nose, hair and/or eyebrows in the iris image, and rotate the iris imaging module according to the positions of the eyes, the mouth, the nose, the hair and/or the eyebrows.

16. The automatic iris snapshot apparatus according to claim 15, further comprising:

a double-eye distance calculation module, configured to calculate a distance between the double eyes according to the left-eye coordinate and the right-eye coordinate;

a distance acquisition module, configured to obtain a distance between the human face imaging module and the center of the double eyes according to a pre-stored relationship between the distance between the double eyes and the distance from the human face imaging module to the center of the double eyes, a focusing module, configured to focus the iris imaging module according to the distance between the face imaging module and the center of the double eyes.

* * * * *